May 13, 1958

K. J. NEARY 2,834,537

COMPRESSOR STATOR STRUCTURE

Filed Jan. 18. 1954

INVENTOR.
KENNETH J. NEARY

BY

Knox & Knox

ATTORNEY IN FACT
FOR APPLICANT

United States Patent Office 2,834,537
Patented May 13, 1958

2,834,537

COMPRESSOR STATOR STRUCTURE

Kenneth J. Neary, El Cajon, Calif., assignor to The Ryan Aeronautical Co., San Diego, Calif., a corporation of California Application January 18, 1954, Serial No. 404,437

7 Claims. (Cl. 230—133)

The present invention relates generally to compressors, turbo-jet engines and the like and more particularly to a compressor stator structure.

In present compressors, the stator blades are normally mounted in a ring, which itself is fastened to the compressor casing, or is held by additional retaining rings. The blades have root portions of complicated shapes such as the fir-tree or dovetail type, which fit correspondingly shaped slots in the stator ring. These specially shaped roots are considered necessary to ensure accurate alignment and positive retaining of the blades. Moreover, the blades are often riveted or peened in place. This construction is essentially costly and requires much machining.

The present invention provides an extremely low cost method of retaining the compressor stator blades, the blades being of simple cast or molded construction. Each individual blade is provided with a mounting platform having key locating and aligning means. In the assembled position, the mounting platforms of the adjacent blades abut to form a continuous segmented ring which serves the same purpose as the unitary ring previously required. The manufacture of the blades having individual mounting platforms is far simpler and less costly than the extensive machining required to produce the unitary retaining ring. Moreover, the replacement of individual blades is simplified in the case of damage. The blades are keyed into retaining rings which are bolted directly to the compressor casing, no intermediate stator rings being required. The low cost structure is particularly suited for aircraft turbo-jet engines having a short working life such as those used in guided missiles or target drones. In these engines extreme precision is not essential, although the keyed structure of the present invention retains the blades accurately in position according to approved design requirements.

The primary object of this invention is to provide a stator structure in which the individual stator blades are keyed into retaining rings which are attached directly to the compressor casing.

Another object of this invention is to provide such a stator structure which is particularly suitable for holding stator blades of simple cast or molded construction.

Another object of this invention is to provide a stator structure in which the blades are located and held accurately in position with a minimum of precision machining.

Another object of this invention is to provide a stator structure in which the inner surface of the compressor structure is relatively uninterrupted so that the smooth flow of gases therethrough is unimpaired, the structure being particularly suited to axial flow compressors.

Another object of this invention is to provide a compressor stator structure which is inexpensive and practicable to manufacture.

Finally, it is an object of this invention to provide a compressor stator structure of the aforementioned character which is simple, safe and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figures 1, 2, 3, 4, 5:
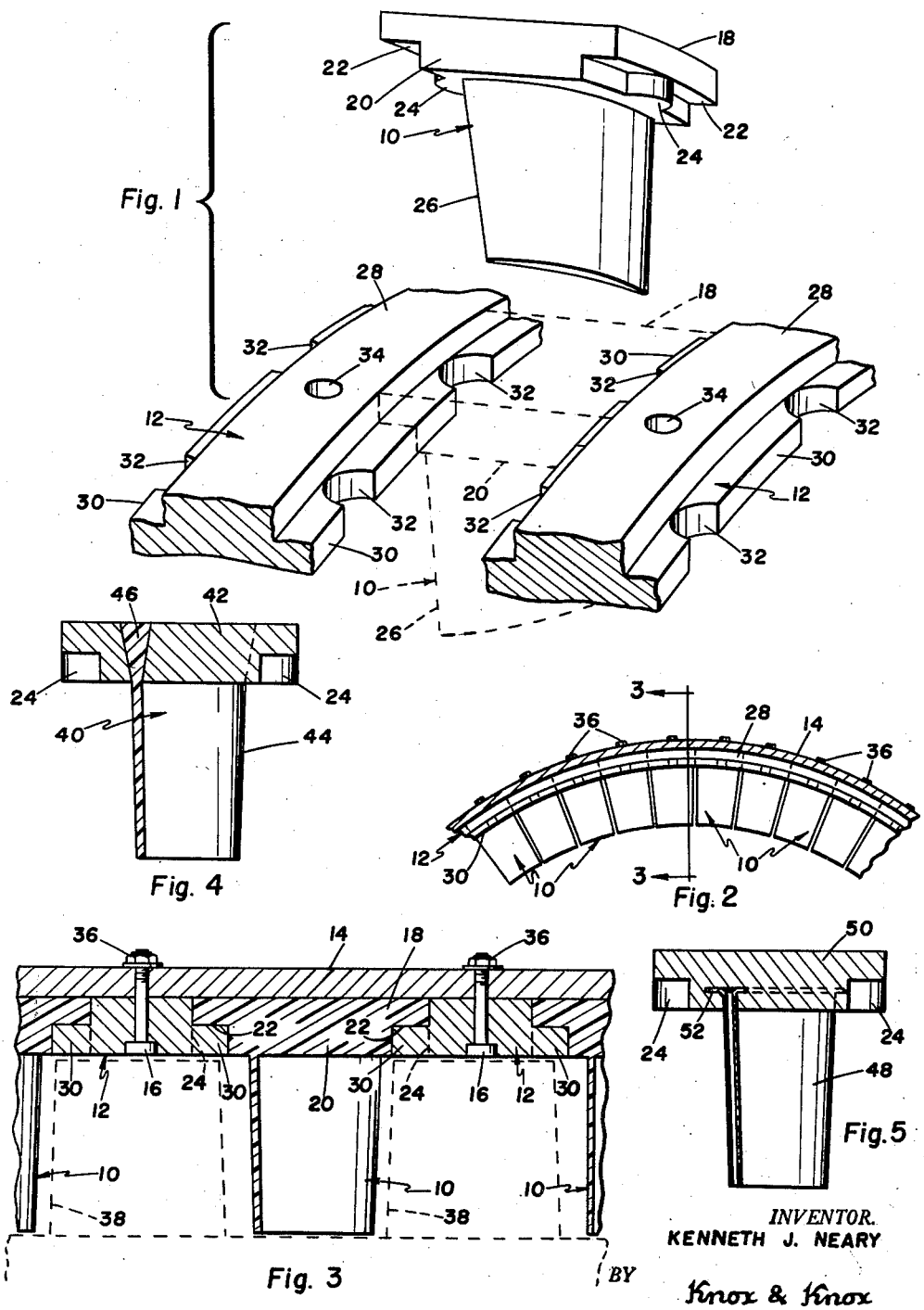
Fig. 1 is an exploded, fragmentary perspective view of a single stator blade and the retaining rings.
Fig. 2 is a reduced, fragmentary end elevation view of the stator blade assembly attached to the compressor casing.
Fig. 3 is an enlarged sectional view taken on the line 3—3 of Fig. 2.
Fig. 4 is a sectional view, similar to the center portion of Fig. 3, showing a modified blade and platform structure.
Fig. 5 is a sectional view, similar to Fig. 4, showing a further modified blade structure.

Referring now to the drawing, the structure includes a plurality of stator blades 10 which are held between spaced retaining rings 12 and 12. These retaining rings are secured to the inside of a compressor casing 14 by means of bolts 16 so that the blades 10 are held tightly in place against the compressor casing.

Each stator blade 10 comprises a platform 18 having a thickened portion 20 and reduced thickness portions extending from two opposed sides of the thickened portion 20. The platform is substantially rectangular in shape and is slightly curved in cross section to conform to the inner diameter of the compressor casing 14. The thickened portion 20 extends the full width of the platform 18 in the direction of curvature so that a recess 22 is provided at each end of the platform. The thickened portion 20 is extended to form a pair of opposed keys 24 generally semi-circular in shape and extending to the ends of the platform 18 as shown in Fig. 1. Formed integrally with the thickened portion 20 is a blade 26 of suitable airfoil section.

Each retaining ring 12 comprises a ring 28 having longitudinally extending opposed flanges 30 at the inner edges thereof. The ring 28 is equal in thickness to the total thickness of the platform 18 and the thickened portion 20, while the flanges 30 are equal in thickness to the depth of the recesses 22. The flanges 30 are provided with a plurality of spaced notches 32 shaped to receive the keys 24. The notches 32 are spaced so that the side faces of the adjacent blade platforms 18 are closely adjacent when the blades are assembled. The rings 28 are provided with suitably located bores 34 to receive the bolts 16. The stator structure is assembled by inserting the required number of stator blades 10 between a pair of retaining rings 12 and securing the retaining rings to the inside of the compressor casing 14 by means of bolts 16, the bolts being held by lock nuts 36. Each stator blade 10 is held accurately in place by the keys 24 which are locked in the notches 32.

The structure may be used in a multi-stage compressor, the opposed flanges 30 serving to hold additional rows of stator blades 10 as illustrated in Fig. 3. Alternatively, when used in a single stage compressor the unused flanges 30 of the retaining rings 12 may be abutted by suitable end rings, not shown, the design of which will be dictated by the particular compressor structure.

It will be evident that the inner surface of the stator assembly is substantially smooth so that the flow of air or other gases therethrough is undisturbed. In addition the retaining rings 12 also serve as shrouds for the rotor blades 38 shown dotted in Fig. 3 for illustrative purposes.

The blades 10 may be molded of suitable plastic or cast in one piece from metal, either process being sufficiently accurate to produce a close fitting blade. The substantial reduction in cost will be readily appreciated when compared to existing types of compressor blades which require extensive machining to obtain the correct profiles. As stated previously, the primary use of the present structure is for aircraft jet engines having a short working life, such as the expendable units used in missiles and target aircraft. In these instances, low cost and simplicity of construction are essential features.

An alternative method of constructing the stator blades is shown in Fig. 4, in which the stator blade 40 comprises a platform 42 and a blade 44. The platform 42 is similar in all respects to the platform 18. The blade 44 is constructed separately of plastic or metal and has a dovetailed end 46. The platform 42 is molded or cast about the dovetailed end 46 so that the blade is held tightly therein. This two piece construction enables the actual blades to be fabricated more accurately, yet does not appreciably increase the cost of manufacture, the simple key and notch method of assembly remaining unchanged. This structure is particularly suitable for jet engines used in certain types of target aircraft which are recovered after each flight and reused, the engine thus being subjected to a longer working life.

A further modified form of blade structure is illustrated in Fig. 5, in which a blade 48, of hollow or tubular metal construction, is embedded in a cast platform 50. The blade 48 has a flange 52 formed thereon to ensure a positive bond with the platform 50, said platform, of course, being similar in construction to the platform 42. The hollow metal blade structure is applicable to certain types of compressors in which plastic blades are unsuitable due to high temperature conditions. The hollow blade structure is also light in weight and is easily cooled internally when extreme temperatures are encountered.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An axial flow compressor stator structure, comprising a plurality of stator blades having platforms thereon at one end, said platforms each having opposed keys integral therewith on the face adjacent the blade, retaining rings having spaced notches to receive said keys, a compressor casing, and means for securing said retaining rings to said compressor casing with said blades therebetween.

2. A compressor stator structure, comprising a plurality of stator blades having platforms thereon at one end, said platforms each having opposed keys integral therewith on the face adjacent the blade, retaining rings having opposed flanges, said flanges having spaced notches to receive said keys, a compressor casing, and means for securing said retaining rings to said compressor casing with said blades therebetween.

3. A compressor stator structure, comprising a plurality of stator blades having platforms thereon, said platforms having thickened portions, the portion of each platform remote from the blade extending beyond said thickened portion on opposite sides and defining recesses at the sides of the platform, and said thickened portions having keys extending therefrom into the recesses, retaining rings having opposed flanges shaped to fit in said recesses, said flanges having spaced notches to receive said keys, a compressor casing, and means for securing said retaining rings to said compressor casing with said blades therebetween.

4. A compressor stator structure comprising a plurality of unitary stator blades having rectangular platforms integral therewith at one end, said platforms having thickened portions, the portion of each platform remote from the blade extending beyond said thickened portion on opposite sides and defining recesses at the sides of the platform, and said thickened portions having keys extending therefrom into the recesses, retaining rings having opposed flanges at their inner edges, said flanges having notches to receive said keys and spaced to hold said stator blades in abutting relation, a compressor casing, and means for securing said retaining rings to said compressor casing with said blades therebetween.

5. A compressor stator structure, comprising a plurality of rectangular blade platforms, blades embedded at one end in said platforms, the platforms having thickened portions, the portion of each platform remote from the blade extending beyond said thickened portion on opposite sides and defining recesses at the sides of the platform, and said thickened portions having keys extending therefrom into the recesses, retaining rings having opposed flanges at their inner edges, said flanges having notches to receive said keys and spaced to hold said stator blades in abutting relation, a compressor casing, and means for securing said retaining rings to said compressor casing with said blades therebetween.

6. A compressor stator structure, comprising a plurality of rectangular blade platforms, blades having laterally extending flanges at one end thereof, the flanged ends of said blades being embedded in said platforms, the platforms having thickened portions, the portion of each platform remote for the blade extending beyond said thickened portion on opposite sides and defining recesses at the sides of the platform, and said thickened portions having keys extending therefrom into the recesses, retaining rings having opposed flanges at their inner edges, said flanges having notches to receive said keys and spaced to hold said stator blades in abutting relation, a compressor casing, and means for securing said retaining rings to said compressor casing with said blades therebetween.

7. A compressor stator structure, comprising a plurality of stator blades having individual platforms unitary therewith, each of said platforms having reduced thickness portions at opposing edges of the platform and a thickened portion between said reduced thickness portions and the corresponding blade, keys unitary with said platform and extending in opposed relation from said thickened portion toward said edges, the combined thickness of each of said keys and the corresponding reduced thickness portion being equivalent to that of said thickened portion, a compressor stator casing having a plain cylindrical inner surface, retaining rings of an external diameter equal to the internal diameter of said casing and having opposed flanges of a dimension measured radially equal to the thickness of said keys, said flanges having notches to receive said keys and spaced to hold said platforms in abutting relation, said retaining rings being bolted to said casing with said flanges engaging said reduced thickness portions, the axes of said keys and notches being radial to said casing.

References Cited in the file of this patent
UNITED STATES PATENTS

| | | |
|---|---|---|
| 2,654,565 | Feilden | Oct. 6, 1953 |
| 2,693,904 | Boyd | Nov. 9, 1954 |

FOREIGN PATENTS

| | | |
|---|---|---|
| 128,499 | Sweden | June 20, 1950 |
| 138,300 | Australia | Aug. 10, 1950 |
| 148,304 | Australia | Sept. 22, 1952 |
| 233,643 | Switzerland | Nov. 16, 1944 |